Nov. 28, 1961 R. O. DAVIS 3,010,589
RACK UNLOADER
Filed March 19, 1958 3 Sheets-Sheet 1
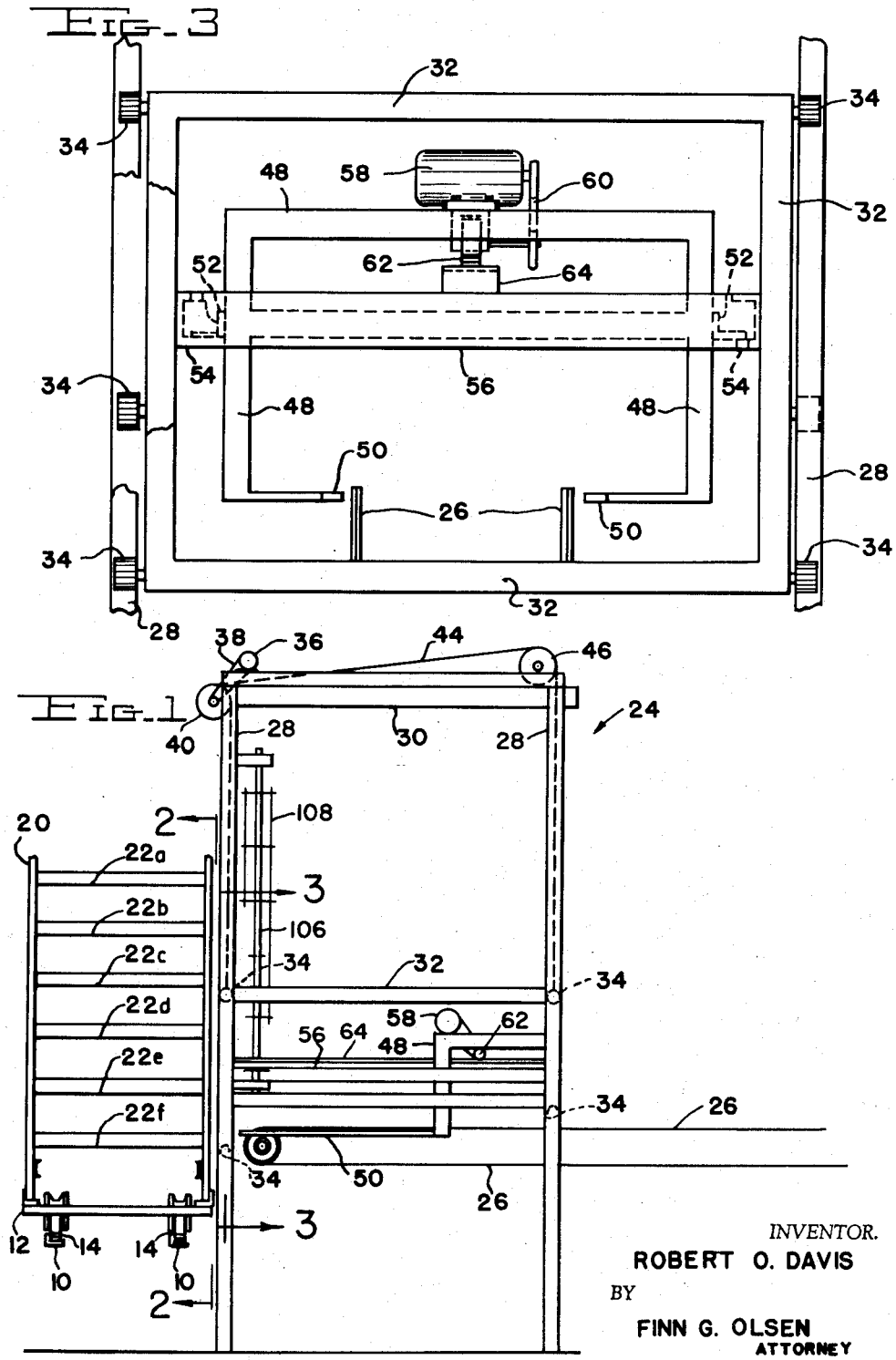
INVENTOR.
ROBERT O. DAVIS
BY
FINN G. OLSEN
ATTORNEY

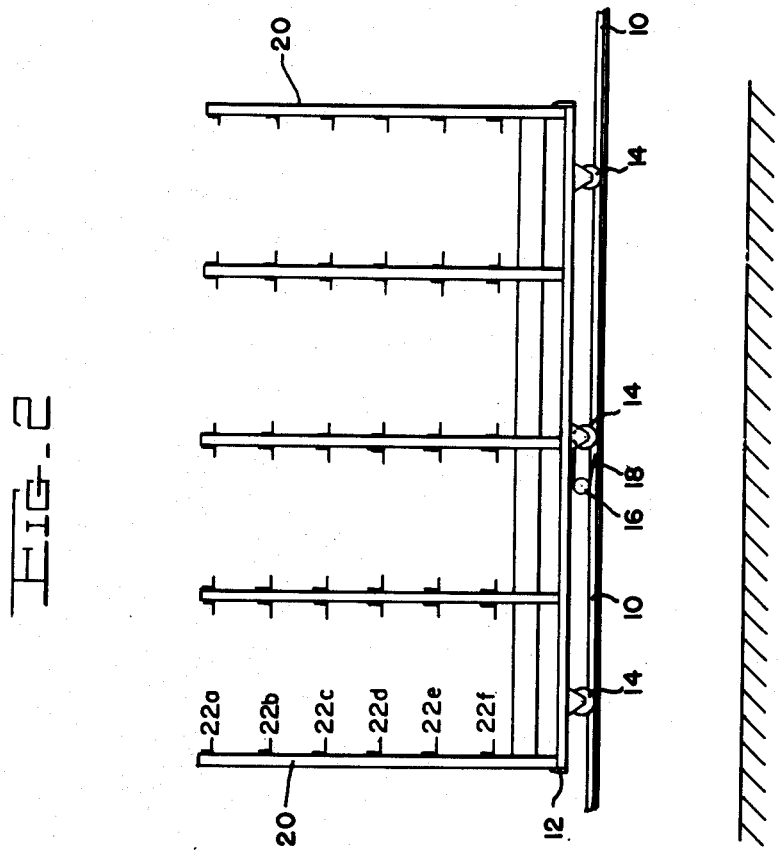

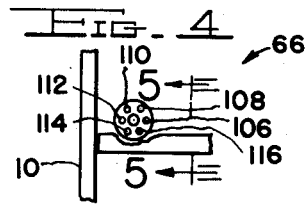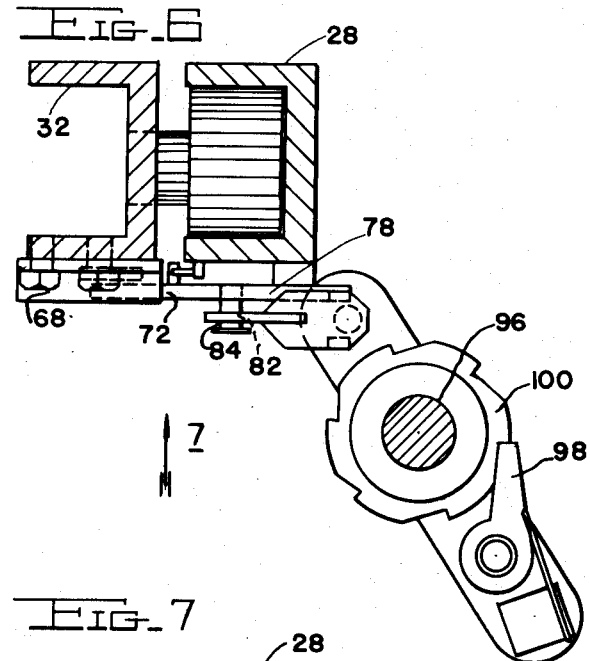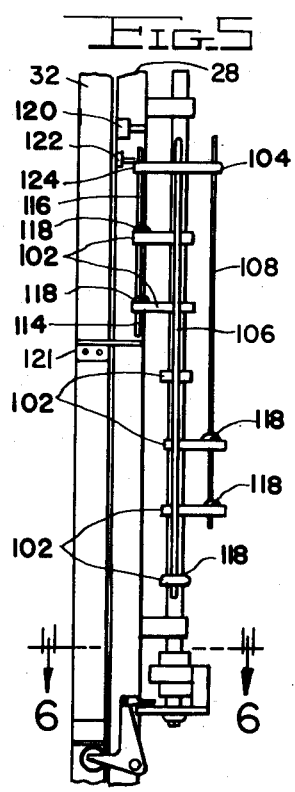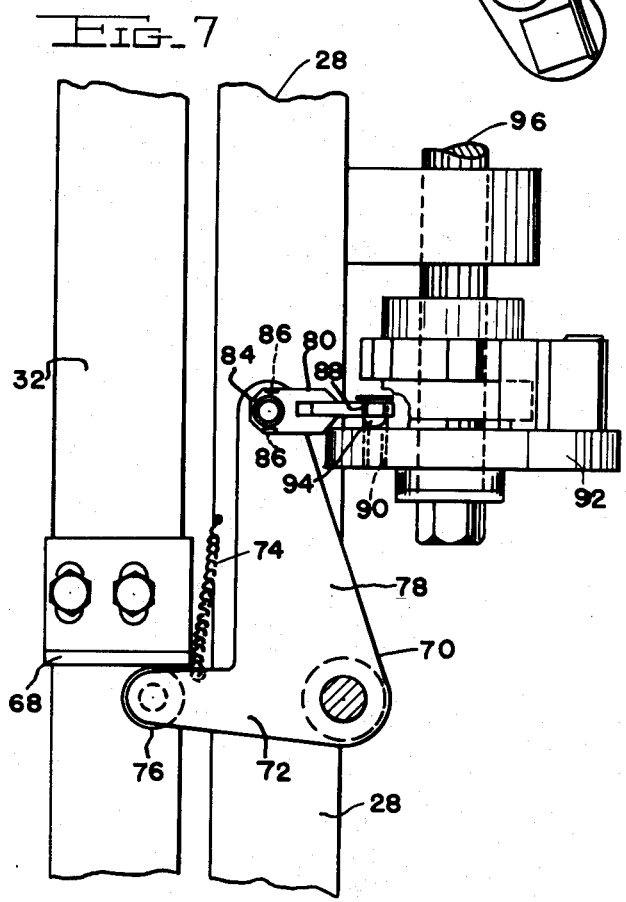

United States Patent Office 3,010,589
Patented Nov. 28, 1961

3,010,589
RACK UNLOADER
Robert O. Davis, Adrian, Mich., assignor to The Gene
Olsen Corporation, Adrian, Mich., a corporation
Filed Mar. 19, 1958, Ser. No. 722,466
1 Claim. (Cl. 214—89)

The present invention relates to a method of apparatus for stacking and unstacking building blocks primarily at certain periods during their manufacture. This is a continuation-in-part of my prior application, Serial No. 468,000, filed November 10, 1954, now Patent No. 2,869,739.

As was stated in my prior application, in the manufacture of building blocks the blocks are initially formed in molds and subsequently are heated in order to harden or cure them. The molding of the blocks is normally accomplished continuously and automatically in molding machines. In order to operate the molding machines continuously, some means must be provided for carrying blocks away from the molding machine as the blocks are formed. This means usually is an endless conveyor on which are positioned as series of flat pallets. After each block is formed it is carried on one of the pallets and is moved out of the machine via the conveyor.

The blocks are then transferred to a chamber or autoclave in which they are hardened or cured by a heating process. So that the molding machines are not idled periodically, it is necessary that the autoclave have sufficient capacity to handle the blocks as rapidly as such blocks are formed in the molding machine. In order for the autoclave to operate at maximum efficiency, the blocks must be stacked in vertical layers within the autoclave allowing the entire volume within the autoclave to be occupied by the blocks to be cured. This condition requires that the blocks when removed from the molding machine be regrouped into vertically spaced layers.

As is taught in the aforesaid copending application, Serial No. 468,000, now Patent No. 2,869,739, this problem has been solved by using a number of racks, each having a series of vertically spaced decks for accommodating pallets of green or uncured blocks. A carriage is provided for transferring pallets and blocks from the molding machine conveyor to the various decks of each rack. The carriage is equiped with one or more lift arms for raising pallets containing blocks from the conveyor and transferring them to the various decks of the racks. When a rack is completely loaded with blocks it is transferred to an autoclave.

After being heated for the necessary period of time in the autoclave, the blocks must be stacked or stored until ready for shipment out of the block manufacturing plant. It is not feasible to store the cured blocks in the racks because, among other reasons, the cost of providing sufficient racks would be prohibitive. It is therefore necessary that the cured blocks be removed from their racks after they have emerged from the autoclave.

While the present invention is intended primarily to be used in unloading pallets containing cured blocks, it will be understood by those skilled in the art that this invention can be used in removing either cured or uncured blocks from a carrier supporting a plurality of multi-deck racks, and the present invention is not limited to the particular use set forth in the present application.

It is an object of the present invention to provide a method and apparatus for automatically transferring either empty or loaded pallets from a carriage carrying a plurality of multi-deck racks in which said pallets are carried in vertically and horizontally spaced relationship, to a continuously moving endless conveyor adjacent said carriage.

It is another object of the present invention to provide a method and apparatus of the foregoing character which permits the vertical spacing of the concrete blocks in the multi-deck racks to be the minimum allowable for good practice in the autoclave, and which still permits removal of the pallets singly from the multi-deck racks.

It is still another object of the present invention to provide a method and apparatus of the foregoing character wherein the sequence of steps of unloading the multiple deck racks can be carried out manually or by automatic means.

Other objects of this invention will appear in the following description and appended claim, reference being had to the accompanying drawings forming a part of this specification wherein like reference characters designate corresponding parts in the several views.

In the drawings:

FIGURE 1 is a front elevational view of one embodiment of the present invention;

FIGURE 2 is an end elevation taken on the line 2—2 of FIGURE 1;

FIGURE 3 is an enlarged fragmentary end elevation with portions broken away taken substantially on the line 3—3 of FIGURE 1;

FIGURE 4 is a fragmentary elevational view of the embodiment of FIGURE 1 showing a portion of the automatic control means;

FIGURE 5 is a fragmentary elevational view taken in the direction of the arrows 5—5 in FIGURE 4;

FIGURE 6 is a sectional view taken on lines 6—6 in FIGURES 5 and 7; and

FIGURE 7 is a fragmentary elevational view taken in the direction of the arrow 7 in FIGURE 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings a more detailed description of the present invention will now be given. Attention is directed first to FIGURES 1 and 2 which show a pair of tracks 10 on which is positioned a carrier 12 by means of the wheels 14. An electric motor 16 is mounted on the carrier 12 and is connected to one of the wheels 14 by a drive belt 18. The carrier 12 can be moved in either direction on the tracks 10 by changing the direction of rotation of the motor 16. This is accomplished by a suitable switch means (not shown).

Carried on the carrier 12 is a pair of multi-deck racks 20. Each rack 20 has six decks numbered from to bottom 22a, 22b, 22c, 22d, 22e and 22f, and it will be understood that other numbers of decks may be used. Such decks are here shown as being formed by inwardly turned angle irons on which pallets can be carried. The decks 22a, 22b, 22c, 22d, 22e and 22f are spaced apart a sufficient distance so that pallets carrying molded concrete blocks can rest on each deck with a relatively small clearance between the top of one block and the bottom of the pallet immediately above. This limited clearance permits loading and unloading of the multi-deck racks 20 while at the same time assuring that the maximum number of concrete blocks can be housed within the autoclave during the curing operation. As was explained in the aforesaid copending application, Ser. No. 468,000, the tracks 10, the carrier 12 and the multi-deck racks 20 are used in transferring the green uncured blocks from the molding machine to the autoclave or curing chamber and are also used in returning the cured blocks from the autoclave or curing chamber.

For the purpose of unloading the multi-deck racks 20, a rack unloading device 24 is provided. The unloading device 24 is positioned adjacent the tracks 10 with its pallet conveyor 26 generally normal to the path of movement of the carrier 12 which is on the tracks 10. The pallet conveyor 26 comprises two endless chains which turn in a clockwise direction as viewed in FIGURE 1 so that any pallet deposited on the upper portion of the conveyor 26 will be carried away from the tracks 10.

The rack unloading device 24 has four vertical tracks 28, two being on one side of the conveyor 26 and the other two being positioned on the opposite side of conveyor 26. A suitable framework 30 joins these tracks rigidly together.

Positioned within the confines of the four tracks 28 and vertically movable thereon is an elevator 32 which has eight rollers 34, one at each of its corners, for riding on the tracks 28. Positioned on the top of the framework 30 is a reversible electric motor 36 which is connected by a drive belt 38 to the pulley wheels 40. Cables 42 fit around the pulley wheels 40 and are connected at their lower ends to the elevator 32. Also connected to the pulley wheels 40 are the cables 44 which fit over the pulley wheels 46 and are also connected to the elevator 32. Thus, when the electric motor 36 is turned in one direction, the cables 42 and 44 will raise the elevator 32 and when the electric motor 36 is turned in the opposite direction the cables 42 and 44 will lower the elevator 32.

Mounted within the elevator 32 is a carriage 48 which is adapted to move in a horizontal direction for transferring loaded pallets from the multi-deck rack 20 to the interior of the rack unloading device 24. The carriage 48 will be described with particular reference to FIGURES 1 and 3 of the drawings. The carriage 48 has a forwardly extending arm construction 50 which is adapted to extend into the multi-deck racks 20 for lifting the pallets from the decks 22a, 22b, 22c, 22d, 22e and 22f. The carriage 48 has a pair of slides 52 formed integrally with the subcarriage 56. Reciprocal movement of the carriage 48 within the subcarriage 56 is accomplished by means of the reversible electric motor 58 which has a belt drive 60 operatively connected to the pinion 62 with the latter being in mesh with the rack 64. The rack 64 is connected to the subcarriage 56 while the other parts including the reversible electric motor 58, the belt drive 60 and the pinion 62 are mounted on the carriage 48. Thus, when the reversible motor 58 is turned in one direction the carriage 48 will move horizontally to the left, as seen in FIGURE 1, and when the reversible motor 58 is turned in the opposite direction the carriage 48 will move to the right. From the foregoing it can be seen that when it is desired to remove a pallet containing molded concrete blocks from the multi-deck rack 20, the elevator 32 will be raised so that the arm construction 50 will be opposite but immediately below the top deck 22a, after which the motor 58 can be started advancing the arm construction 50 to the left and under the pallet on the top deck 22a. Thereafter, the electric motor 36 can be started raising the elevator 32 a small amount sufficient to lift the pallet from the deck 22a. The electric motor 58 can then be turned in the opposite direction returning the arm construction 50 to its original position within the elevator 32. The electric motor 36 can again be started but in the opposite direction so that the elevator will descend until the arms 50 pass below the upper level of the endless conveyor 26. The pallet carried by the arm construction 50 will then be deposited on the conveyor 26, and the latter can then be started so that the loaded pallet will be removed from above the arm construction 50. This complete cycle of operation will be repeated but this time the elevator will be stopped with the arm construction 50 immediately below the second deck. Each of the succeeding cycles will be the same except that the arm construction 50 will be stopped immediately below each of the next succeeding decks that are carrying molded concrete blocks.

In the present application an unloading cycle starting from the top deck 22a and proceeding downward is described. However, it is to be understood that the present invention covers the reverse cycle as well, and in many instances it will be recognized by those skilled in the art that it will be more desirable to unload the bottom deck 22f first and then proceed upward in unloading the remaining racks. Such reverse cycle can be carried out merely by rearranging the timing controls to be described hereafter.

From the foregoing it will be understood that the present invention can be carried out by using push button switches for starting and stopping each of the reversible electric motors 36 and 58. However, it is contemplated that means will be provided for automatically controlling the movement of these motors. Generally, control of the unloader can be accomplished with conventional limit switches and/or control drums. One such device which is taught in my prior pending application, Ser. No. 468,000, will be described with reference to FIGURES 4, 5, 6 and 7.

A control mechanism 66 mounted on the external side of the vertical rail 28 may be used for automatically stopping the elevator in sequence before each of the decks of the multi-deck racks 20. The control mechanism 66 includes an angle iron 68 which is secured to the elevator 32 and acts as an actuator for control mechanism 66. Mounted on the vertical track 28 is a bell crank 70 with its arm 72 urged upwardly by the tension spring 74. The free end of arm 72 carries a roller 76 which lies in the path of the actuator 68 which is secured to elevator 32. Arm 78 of bell crank 70 carries at its free end a pivotally mounted link 80 which is drilled through and counter-sunk at 82. The pivotal mounting for link 80 includes a flanged sleeve 84 which projects from arm 78 through opening 82. Link 80 is free to pivot around the axis of sleeve 84 in a plane parallel to arm 78 and the counter-sunk portions in opening 82 to permit the link to have a certain amount of movement in an axial direction or at right angles to arm 78. A pair of half round portions 86 are secured on link 80 and prevent any binding between arm 78 and the link 80.

The free end of link 80 is drilled through and counter-sunk at 88 for loosely receiving a flanged sleeve 90 which projects from an elongated arm 92. Sleeve 90 allows link 80 to pivot around its axis and the counter-sunk portions permit link 80 to have a certain amount of additional movement around the axis of sleeve 84. A pair of half rounds 94 prevent binding between link 80 and arm 92. Thus, link 80 serves to translate movement of crank 70 into movement of arm 92.

Arm 92 is rotatably mounted on a vertical shaft 96 and carries a spring urged pawl 98 which engages the teeth of a ratchet 100 fixedly secured on shaft 96. It will be seen that as elevator 32 descends, stops 68 will strike roller 76 on arm 72 and through link 80 will cause arm 92 to pivot around the axis of shaft 96. Pawl 98 will engage the teeth of ratchet 100, and thereby, will rotate shaft 96. When elevator 32 ascends crank 70 will rotate in a clockwise direction as seen in FIGURE 7 and arm 92 will turn in a clockwise direction, as seen in FIGURE 6, to allow pawl 98 to slip over one of the teeth on ratchet 100, and thereby, to reset the pawl 98 for further rotation of shaft 96 on the next descent of the elevator 32. The dimensions and positions of the various arms and pawl ratchet mechanisms are so chosen that each time the arm on elevator 32 descends into engagement with roller 76 shaft 92 will be rotated one-sixth of a revolution.

Shaft 96 carries six apertured arms 102 at spaced positions along its length and a circular plate 104 adjacent its upper end. Plate 104 has six apertures for slidably receiving the upper end of the six rods of varying length, numbered 106, 108, 110, 112, 114 and 116. Each arm 102 slidably receives the lower end of one of the rods and each rod carries a stop 118 for limiting downward movement of the rod through the arm. Mounted on the vertical track 28 above the plate 102 is a limit switch 120.

The operation of the elements of the control device 66 is such that when the elevator 32 reaches the upper limit of its travel (assuming it is desired to unload the uppermost deck on rack 20), a projection 121 on the elevator 32 will strike the lower end of rod 116. This rod will be moved upwardly and will strike the limit switch 120. Switch 120 is in the circuit including the motor 36 which controls movement of the cables 42 and 46. Actuation of the switch 120 will open electrical contacts and, therefore, cause the motor 36 to be stopped with the consequent halting of elevator 32. It will be appreciated that the length of rod 116 is chosen so that elevator 32 will be stopped when arm construction 50 is immediately below a horizontal alignment with the top deck 22a on rack 20.

After the top deck of rack 20 is unloaded, as will be described, and as the elevator 32 lowers carriage 48 down to a position where the arm construction 50 is below the upper side of conveyor 26, angle iron 68 on the elevator 32 will strike roller 76 on arm 72 and thereby cause shaft 96 to turn through one-sixth of a revolution. This movement of shaft 96 causes rod 114 to be positioned in vertical registry with the actuating arm on limit switch 120. Normally, the rack 20 is provided with six decks and the control mechanism 66 is provided with six rods so that each time that the elevator 32 descends a different one of the rods is positioned in vertical registry with the actuating arm on switch 120, and each time the elevator 32 seconds the arm construction 50 of the carriage 48 will be caused to be positioned immediately below horizontal alignment with a different deck on the rack 20.

In addition to switch 120, there is also provided a switch 122 with an actuating arm in horizontal registry with a projection 124 on the upper face of plate 104. Plate 104 will make one complete revolution during the unloading of one multi-deck rack 20. When a rack 20 is completely unloaded, plate 104 will have been rotated so as to bring projection 124 into engagement with the actuating arm of switch 122, thereby closing contact through switch 122. This switch is in the circuit to electric motor 16 which controls movement of carrier 12. It will be recalled that one of the functions of carrier 12 is to present a fully loaded rack in the space before the arm construction 50 for unloading purposes. Switch 122 assures that the carrier will be moved at the correct time during this unloading cycle. A reversing switch and delayed-action limit switches (not shown) are provided on carrier 12 to reverse the electrical connections to motor 16 and to halt the carrier 12 at the desired positions on tracks 10.

There will also be provided limit or time delay switches for advancing the arm construction 50 into the multi-deck rack 20 by means of electrical motor 58 when the elevator 32 has stopped with the arm construction 50 in proper position before the deck that is to be unloaded. Other time delay or limit switches will then function to raise the elevator 32 a small amount sufficient to lift the loaded pallet from the deck to be unloaded by means of the arm construction 50. Thereafter other limit or time delay switches will function to energize the electric motor 58 in the opposite direction for retracting the carriage 48 and its arm construction 50 into the elevator 32.

From the foregoing it can be seen that a relatively simple device has been developed which can unload a plurality of multi-deck racks either by manual or automatic actuation of the switches. Furthermore, the racks can carry several deck loads of concrete or molded blocks closely spaced together in a vertical direction and only enough clearance between loaded decks is required for receiving the arm construction 50.

Having thus described my invention, I claim:

Pallet handling equipment comprising a horizontally movable conveyor adapted to support pallets and having a receiving end, a carrier operably positioned at the receiving end of said conveyor and movable horizontally at substantially right angles to said conveyor, a multi-deck rack positioned on said carrier and having a plurality of vertically spaced decks each of which is adapted to support a pallet, an elevator positioned at the receiving end of said conveyor, a horizontally movable carriage on said elevator, said carriage having arm means positionable beneath the pallets on the conveyor and extending laterally toward said carrier so that when the carriage is moved horizontally toward the carrier the arm means will be substantially the only space occupying portion of the carriage to enter the multi-deck rack, means for moving said elevator to a position in which said arm means is below the level of and laterally spaced from one of the decks, means for moving the carriage laterally into vertical registry with said one deck, means for raising the carriage until a pallet carried on said one deck is supported on said arm means, means for retracting the carriage out of vertical registry with said one deck to a position in vertical alignment with the receiving end of said conveyor, means for lowering the elevator until said pallet-engaging arm means descends below the receiving end of the conveyor so that the pallet will be placed on the conveyor, and means for stopping said elevator in sequence before each of the next succeeding decks on each of the next succeeding cycles of operation.

References Cited in the file of this patent

UNITED STATES PATENTS

| | | |
|---|---|---|
| 1,344,617 | Burgess | June 29, 1920 |
| 1,441,661 | Church | Jan. 9, 1923 |
| 1,522,600 | Strickland | Jan. 13, 1925 |
| 2,177,941 | Knudson et al. | Oct. 31, 1939 |
| 2,496,000 | Bugenhagen | Jan. 31, 1950 |
| 2,510,573 | Gray | June 6, 1950 |
| 2,535,961 | Schutt | Dec. 26, 1950 |
| 2,624,470 | Geist | Jan. 6, 1953 |
| 2,741,371 | Oswalt | Apr. 10, 1956 |
| 2,869,739 | Davis | Jan. 20, 1959 |

UNITED STATES PATENT OFFICE
CERTIFICATION OF CORRECTION

Patent No. 3,010,589            November 28, 1961

Robert O. Davis

It is hereby certified that error appears in the above numbered patent requiring correction and that the said Letters Patent should read as corrected below.

Column 2, line 56, after "from" insert -- top --; column 5, line 39, for "seconds" read -- ascends --.

Signed and sealed this 24th day of April 1962.

(SEAL)
Attest:

ERNEST G. JOHNSON
Attesting Officer

DAVID L. LADD
Commissioner of Patents